United States Patent
Lang et al.

(10) Patent No.: US 11,549,160 B2
(45) Date of Patent: Jan. 10, 2023

(54) METHOD AND APPARATUS FOR CONTINUOUSLY ENSURING SUFFICIENT QUALITY OF GREEN PELLETS

(71) Applicant: Metso Outotec Finland Oy, Tampere (FI)

(72) Inventors: Sebastian Lang, Darmstadt (DE); Karl Semiller, Rodgau (DE); Suvi Rannantie, Bad Vilbel (DE)

(73) Assignee: METSO OUTOTEC FINLAND OY, Tampere (FI)

( * ) Notice: Subject to any disclaimer, the term of this patent is extended or adjusted under 35 U.S.C. 154(b) by 0 days.

(21) Appl. No.: 17/291,232

(22) PCT Filed: Nov. 6, 2018

(86) PCT No.: PCT/EP2018/080250
§ 371 (c)(1),
(2) Date: May 4, 2021

(87) PCT Pub. No.: WO2020/094211
PCT Pub. Date: May 14, 2020

(65) Prior Publication Data
US 2021/0332457 A1     Oct. 28, 2021

(51) Int. Cl.
*C22B 1/242*     (2006.01)
*C22B 1/24*     (2006.01)

(52) U.S. Cl.
CPC ............ *C22B 1/242* (2013.01); *C22B 1/2406* (2013.01)

(58) Field of Classification Search
CPC .............................. C22B 1/242; C22B 1/2406
See application file for complete search history.

(56) References Cited

U.S. PATENT DOCUMENTS

| 4,091,060 | A | 5/1978 | Carter et al. |
| 6,682,583 | B1 * | 1/2004 | Morioka ................... C22B 1/16 |
| | | | 75/319 |
| 2006/0159614 | A1 | 7/2006 | Apelqvist et al. |
| 2006/0159641 | A1 | 7/2006 | Girardot et al. |

(Continued)

FOREIGN PATENT DOCUMENTS

| EP | 0970369 B1 | 9/2001 |
| GB | 1505827 A | 3/1978 |
| WO | 2015092137 A1 | 6/2015 |

OTHER PUBLICATIONS

Forsmo S P E et al.: "Binding mechanisms in wet iron ore green pellets with a bentonite binder", A Powder Technology—Electrostatic Phenomena in Particulate Processes, Elsevier, Basel (CH), vol. 169, No. 3, Nov. 13, 2006 (Nov. 13, 2006), pp. 147-158, XP027983834, ISSN: 0032-5910 [retrieved on Nov. 13, 2006] paragraphs [03.1], [03.2], [0006].

(Continued)

*Primary Examiner* — Scott R Kastler
(74) *Attorney, Agent, or Firm* — Robert P. Michal, Esq.; Carter, DeLuca & Farrell LLP

(57) ABSTRACT

A method for controlling pellet quality in iron ore production includes the steps of mixing water, binder and iron ore particles in at least one mixer to form a mixture (step (i)) and pelletizing the mixture into green pellets (step (ii)). Between step (i) and step (ii), a part of the mixture is taken in a sampling operation, formed into a test specimen and subjected to a test.

6 Claims, 1 Drawing Sheet

(56) References Cited

U.S. PATENT DOCUMENTS

2009/0031857 A1 2/2009 Auranen
2021/0332457 A1* 10/2021 Lang ...................... C22B 1/242

OTHER PUBLICATIONS

Eisele TC et al.: "A Review of Binders in Iron Ore Pelletization", Mineral Processing and Extractive Metallurgy Review, Gordon and Breach, New York, NY, US, vol. 24, Jan. 1, 2003 (Jan. 1, 2003), pp. 1-90, XP009033605, ISSN: 0882-7508, DOI: 10.1080/08827500306896 paragraph "Batch balling".

International Search Report issued by the European Patent Office acting as the International Searching Authority in relation to International Application No. PCT/EP2018/080250 dated Jul. 18, 2019 (4 pages).

Written Opinion of the International Searching Authority issued by the European Patent Office acting as the International Searching Authority in relation to International Application No. PCT/EP2018/080250 dated Jul. 18, 2019 (9 pages).

International Preliminary Report on Patentability issued by the European Patent Office acting as the International Preliminary Examining Authority in relation to International Application No. PCT/EP2018/080250 dated Oct. 9, 2020 (13 pages).

* cited by examiner

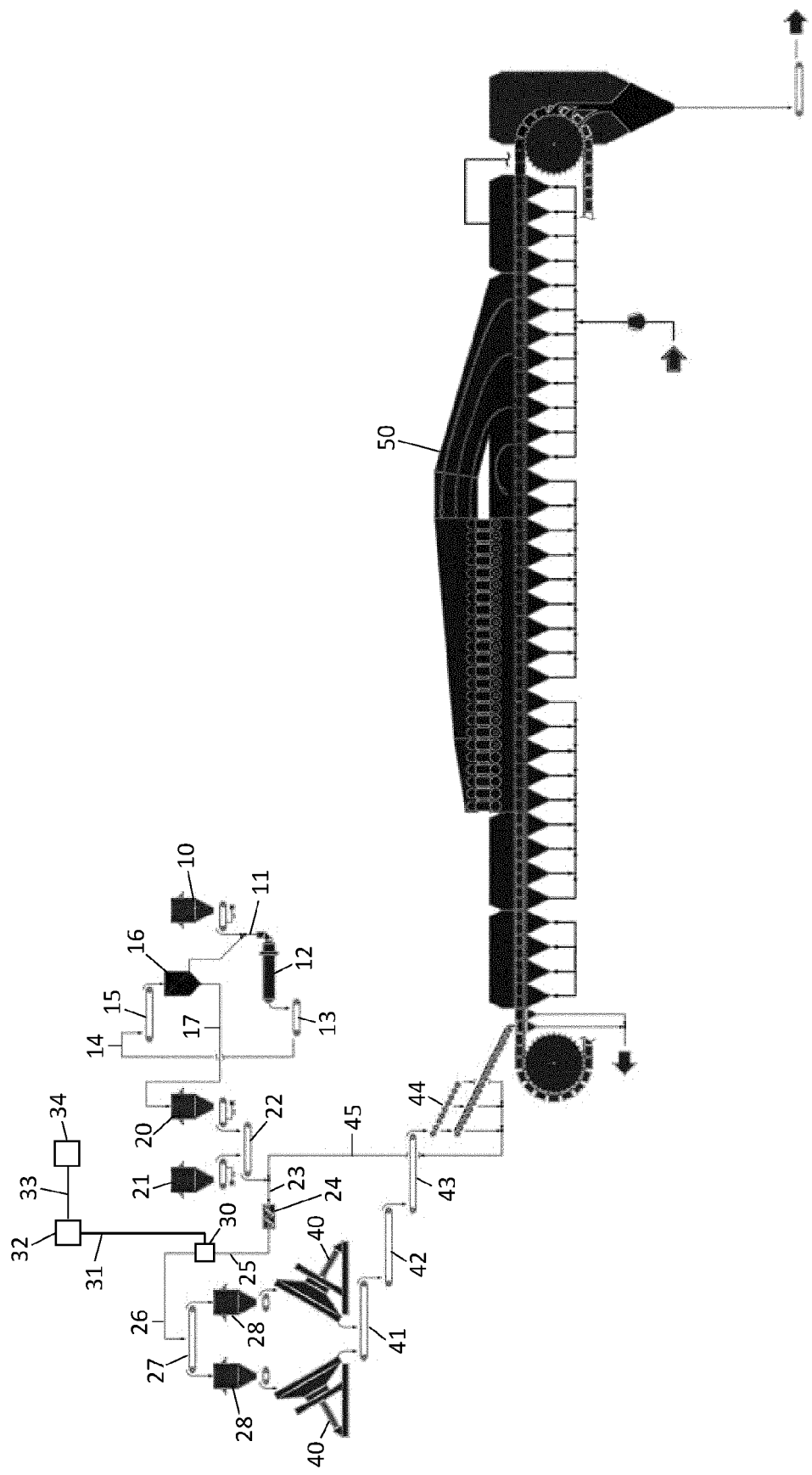

METHOD AND APPARATUS FOR CONTINUOUSLY ENSURING SUFFICIENT QUALITY OF GREEN PELLETS

CROSS-REFERENCE TO RELATED APPLICATIONS

This application is a national phase entry under 35 U.S.C. 371 of PCT International Application No. PCT/EP2018/080250 filed Nov. 6, 2018, the disclosure of this application is expressly incorporated herein by reference in its entirety.

The present invention is directed to a process and its relating plant for regulating pellet quality in iron ore production, whereby the process comprises the step of (i) mixing water, binder and iron ore particles in at least one mixer into a mixture and (ii) pelletizing the mixture into green pellets.

When pelletizing iron, the pellets are previously produced by first mixing water, binder and iron ore particles to then form pellets from this mixture. These so-called green pellets are then dried and burnt at temperatures of more than 1000° C.

The quality of these pellets, called green pellets, is a decisive factor for the quality of the pig iron resulting from the firing process. For example, pellets that are too porous can collapse or pellets that are too plastic can deform under load and cause the pellet charge in the grate car to collapse and compact and thus no longer allow sufficient gas to flow through which leads to very high pressure losses and/or that the charge is only flowed through very irregularly.

It is, therefore, known from the state of the art that the green pellets are subjected to a quality control. For example, such a quality control is found in U.S. Pat. No. 4,091,060, describing a measuring apparatus for detecting an intensity of light reflection from iron ore pellets. These reflections allow inference of at least the water content.

EP 0 970 369 B1 relates to a method and a device for monitoring and/or controlling and regulating a granulation, agglomeration, etc. in a fluidized layer or a fluidized bed by determining product moisture. Thereby total product moisture is measured substantially and constantly in the seconds range, without contact, by electromagnetic radiation in the high frequency or microwave range, during at least one stage of the process. Vaporization is evaluated as a measure of total product moisture. Taking into account product temperature, the measuring result is used to maintain total product moisture within a pre-determinable range by altering the spray rate and/or the gas temperature and/or the volume flow, via a regulating circuit.

US 2009/0031857 teaches a continuously, monitoring of pellet quality by an x-ray or laser measurement. GB 1 505 827 teaches also methods and apparatuses for analyzing granular material "on line" so that corrective actions can be taken in due time. In addition, US 2006/0159641 A1 is directed to a real time method for gaining product parameters of raw pellets by a pressure test.

However, the great challenge whilst producing iron ore pellets is to assure stable process conditions in the green pelletizing area. Unfortunately, many uncertainty factors already contribute to the upstream process of material mixing.

A disadvantage of all these controls is that the detection of quality defects in individual green pellets reacts to the fact that the mixing ratio of water, binder and iron ore is adjusted. This means that a considerable period of time elapses, as quality defects can only be detected after the pelletizing/balling process and thus further pellets with insufficient product quality are produced for the time between mixing and pelletizing disc. This time delay between detection and an adjustment of the quantity ratios in the mixture is additionally increased by the fact that storage containers are usually provided between the mixer and the pelletizing discs. This makes it almost impossible to ensure sufficient product quality, especially in the case of strongly fluctuating ore qualities. This decoupling in time by the residence time (several minutes) of the material in the bins makes it impossible to control fluctuations that occur at the feeding of the mixer by directly evaluating green pellet quality and more precisely green pellet plasticity.

The invention is, therefore, based on the task of providing a process and the corresponding device for ensuring a continuously good pellet quality, especially also with fluctuating ore compositions.

A process disclosed in the present application solves this task. This solution takes advantage of the correlation between green pellet plasticity and mixed material properties evaluated in an automated pressure test of a compacted test specimen. With this monitoring system directly situated downstream of the mixer it is possible to close the control loop and adjust the mixture quality.

In such a process, in a first step (i) water, binder and iron ore particles are mixed in at least one mixer to form a mixture. In a second step (ii) this mixture is pelletized to green pellets.

The decisive factor is that part of the mixture is branched off after step (i) but before step (ii) in a sampling operation and formed into a pressing. Therefore, it is possible to take a test with the pressing, particularly to subject it to a pressure test. Since the sampling is now arranged between step (i) and (ii), a quality determination takes place directly after mixing and thus very closely to the relevant control variables, particularly the admixing of water and binder in defined concentrations. As a result, the described disadvantages of a very long reaction time to detected quality measurement states can be reliably avoided. By producing a test specimen, it is no longer necessary to wait for the pelletizing/balling to take place.

With the test of a specimen directly produced from the mixed material, which gets later on downstream pelletized, and known correlations of mixture and green pellet properties, process controlling can be undertaken to stabilize and optimize the green pelletizing process. So, continuously producing test specimens from material right behind the mixer and automatically testing them with regard to their properties enables a direct control loop for the green pellet properties. Starting the agglomeration on the pelletizing disc with well-conditioned material is essential for the green pellet quality.

It is preferable that at least one storage container is connected downstream for the mixing of the sample. This allows fluctuations in the ore supply to be compensated without the subsequent process of balling and loading pallet cars coming to a standstill. At the same time, a testing previous of the storage tanks ensures that the system can react very quickly to detected quality fluctuations or malfunctions in upstream processes or equipments.

Furthermore, it has proved to be advantageous that the result of the pressure test serves as a control variable and that the quantity of the added binder and/or the quantity of the added water and/or the added mixing energy is used as a control variable. A regulation or control via the added binder quantity is preferred, since this one of the dominating parameters. Furthermore the approach can also be used to optimize binder usage as this is an important cost driver.

Moreover, the invention is based on the knowledge that the control variable can be used to optimally determine the control variable(s). Such variable can be at least one variable chosen from a group comprising the added quantity of water and/or binder as well as the mixing energy. It is preferred that an experimentally generated matrix coupling these variable(s) to test results, is used for outputting the control variable from this matrix on the basis of the control variable, A possible form of the pressing could be a circular cylinder made of solid or hollow material. Alternatively, a prism, preferably a cuboid, has proved to be the optimized form for the pellet. These sizes are relatively easy to produce and provide reliable results in a pressure test.

A continuous process with taking a specimen in defined time intervals, particularly less than half an hour, is preferred.

As already mentioned, the green pellets are usually fired after their production in order to produce pig iron.

The invention also includes a device for controlling the pellet quality in iron ore production. Such a plant has at least one mixer for mixing water, binder and iron ore particles into a mixture and a pelleting device for pelletizing the mixture into pellets.

In accordance with the invention, such a device also contains a sampling unit which branches off part of the mixture. This sampling unit is arranged in such a way that the mixture passes by or through it during operation before it is fed towards the bins and balling discs. Furthermore, the device also contains a sample taking and forming device for producing a pellet from the branched part of the mixture and a testing device, particularly a pressure test device for carrying out a pressure test recording deformation and load force. By this system, a permanently high pellet quality in a downstream travelling grate can be ensured by this system for the first time.

Further features, advantages and possible applications of the invention can also be found in the following description of the drawing and the example. All the characteristics described and/or depicted, individually or in any combination, form the subject matter of the invention, irrespective of their combination in the claims or their back references.

It shows:

FIG. 1 shows a schematic representation of a plant according to the invention.

The iron ore is crushed in a grinding section with feed bins 12 and transported via an integrated continuous conveyor via line 11 into a grinding mill 12, via another continuous conveyor 13, line 14 and continuous conveyor 15 finally into a material sieving device 16. From there it is transported via line 17 to a collecting bin 20.

From there it is conveyed via an integrated first continuous conveyor to a second continuous conveyor 22 and from there via line 23 to a mixer 24. Mixer 24 also transfers water and/or binder from storage device 21 in its integrated continuous conveyor to continuous conveyor 22 and this material is also fed into mixer 24 via line 23.

In accordance with the invention, a sampling unit 30 is situated in line 25. A part of the material flow is taken by this sampling unit 30 and fed to a forming device 32 via line 31. The test specimens produced there finally reach a test device 34 via line 33. The aforementioned steps 30 to 34 can be situated in one housing/apparatus or realized as single units handing material over. The tested material gets spilled back on the conveyor belt 26 and follows the normal material flow.

Via line 26 the mixture is fed onto a continuous conveyor 27 and then introduced into at least one storage tank 28, which is shown here as two parallel connected containers. The material then passes from at least one storage tank 28 to the pelletizing disc 40, which is equipped with successively connected continuous conveyors 41, 42, 43. These convey the material onto a roller screen 44, where undersized material can be sorted out and fed via line 45 into line 23 and thus to the mixer 24.

From the roller screen 44, the material is then transported to a travelling grate 50 which is not described in detail.

EXAMPLE

A test sample of 300 g of mixed material is taken right after the mixing process. In the lab this means a certain amount is taken from the mixing batch, in the industrial set-up the material can be collected from the transport conveyor right after the mixer by a sampling device.

The collected material is loosely filled into a cylindrical female die of a certain diameter (between 20 and 100 mm) and afterwards compressed with a male die. Manual compression of the specimen in the lab is done by a ram apparatus with three consecutive ram strokes with a weight of 6 kg. The automated compression in case of the industrial monitoring system can be performed pneumatic piston with a certain compacting pressure, typically in the range of several bars.

The test specimen then is moved out of the cylindrical die and transported to a pressure test device. The stamp then is moved down vertically with a constant feeder motion (0.002 to 5 mm/sec) on the pressing and the corresponding force and deformation gets measured.

The plasticity (measured in [$\mu$m/daN]) of the pressing can be withdrawn from the recorded force-distance-relationship. The relevant part of the measured curve forms a linear relationship between 10 and 90% of the distance relative to the breakage force of the test specimen, which can be detected by a decreasing testing force.

Besides plasticity, compressibility and compression strength can be extracted from the measured data. After the actual test procedure the material is spilled out by the automatic test sampler and a new testing process can be initiated.

REFERENCE NUMBERS 10 grinding plant
11 line
12 grinding mill
13 continuous conveyor
14 line
15 continuous conveyor
16 collecting device
17 line
20 collecting device
21 line
22 continuous conveyor
23 line
24 mixer
25 line
26 line
27 continuous conveyor
28 storage tank
31 line
32 forming device
33 line
34 test device
40 pelletizing plate 41 continuous conveyor
42 continuous conveyor
43 continuous conveyor
44 roller screen
50 travelling grate

The invention claimed is:

1. A method for controlling pellet quality in iron ore production, comprising the steps of:
   (i) mixing water, binder and iron ore particles in at least one mixer to form a mixture, and
   (ii) pelletizing/balling the mixture into green pellets,
   wherein between step (i) and step (ii) a part of the mixture is taken in a sampling operation, formed by compressing the part of the mixture into a test specimen and subjected to a pressure test, wherein step (i) is adjusted based on the results of the pressure test by adjusting at least one of: (a) a quantity of the added binder; or (b) a quantity of the added water, wherein the results of the pressure test include a plasticity of the test specimen and the method further comprises:
   decreasing or increasing the quantity of the binder being added into step (i) based on whether the plasticity of the test specimen is respectively above or below a threshold plasticity; or
   increasing or decreasing the quantity of the water being added into step (i) based on whether the plasticity of the test specimen is respectively above or below the threshold plasticity.

2. The method according to claim 1, wherein at least one storage container is connected downstream of the sampling operation.

3. The method according to claim 1, wherein a predetermined matrix is used to adjust the quantity of the binder and/or water based on the results of the pressure test.

4. The method according to claim 1, wherein the test specimen is a circular cylinder or a prism.

5. The method according to claim 1, wherein the method is carried out continuously.

6. The method according to claim 1, wherein the green pellets are subsequently burnt.

* * * * *